United States Patent [19]

Saunders et al.

[11] Patent Number: 5,934,163
[45] Date of Patent: Aug. 10, 1999

[54] CARVING BLANK AND MANDREL FOR MOUNTING SAME IN A CARVING MACHINE

[75] Inventors: Carl Saunders, North Vancouver; Ed Grochowski, Richmond; Jean-Paul Comtesse, Vancouver, all of Canada; Jean-Yves Flageul, Berck Plage, France

[73] Assignee: Vorum Research Corporation, Vancouver, Canada

[21] Appl. No.: 08/783,151

[22] Filed: Jan. 14, 1997

[51] Int. Cl.⁶ .......................... B23B 25/00; B23B 19/02; B23B 3/00; B23B 5/22
[52] U.S. Cl. ................... 82/168; 82/146; 82/117; 279/102; 142/57; 269/47; 83/178; 83/743
[58] Field of Search ............... 428/36.9; 82/168, 82/117, 118, 146; 83/178, 187, 743; 269/48.2, 47; 279/102; 142/57

[56] References Cited

U.S. PATENT DOCUMENTS

| | | |
|---|---|---|
| 249,143 | 11/1881 | Cottrell . |
| 298,421 | 5/1884 | Sherman ................... 279/102 |
| 298,488 | 5/1884 | Mansfield . |
| 582,225 | 8/1897 | Prentice . |
| 660,486 | 10/1900 | Brown, Jr. . |
| 841,727 | 1/1907 | Shigley . |
| 930,169 | 8/1909 | Exley ........................ 82/168 |
| 1,050,575 | 1/1913 | Stryhal . |
| 1,775,610 | 9/1930 | Weiss . |
| 1,829,482 | 10/1931 | Hayden . |
| 1,830,130 | 11/1931 | Pleasance . |
| 1,880,633 | 10/1932 | Wittel . |
| 2,221,089 | 11/1940 | Githens et al. . |
| 2,432,059 | 12/1947 | Zipser ...................... 279/102 |
| 2,652,738 | 9/1953 | Carlson . |
| 2,665,136 | 1/1954 | Fallon ........................ 82/168 |
| 2,762,629 | 9/1956 | Dalby . |
| 2,879,682 | 3/1959 | Parker et al. . |
| 3,482,794 | 12/1969 | Beardsley . |
| 3,521,896 | 7/1970 | Matsumoto ................. 79/102 |
| 3,601,048 | 8/1971 | Beisel . |
| 3,689,003 | 9/1972 | Choinski . |
| 4,320,675 | 3/1982 | Kohlert et al. . |
| 4,711,406 | 12/1987 | Barstow . |
| 4,826,097 | 5/1989 | Grant et al. . |
| 5,138,918 | 8/1992 | Attardi et al. . |
| 5,161,901 | 11/1992 | Dona et al. . |

FOREIGN PATENT DOCUMENTS

| | | |
|---|---|---|
| 499886 | 3/1950 | Belgium . |
| 960978 | 1/1975 | Canada . |
| 127749 | 2/1902 | Netherlands . |
| 175761 | 8/1953 | Netherlands . |

*Primary Examiner*—James C. Housel
*Assistant Examiner*—S. Devi
*Attorney, Agent, or Firm*—Biebel & French

[57] ABSTRACT

An improved carving blank and mandrel for mounting the blank in a carving machine enables accurate carving of prosthetic and orthotic positive shapes. The blanks are simple to mount and dismount and means are provided enabling a repeatable mounting position in one angular orientation only to be achieved. The blanks are firmly fixed in place on the mandrel during the carving operation, and they are simple and inexpensive to manufacture thus reducing manufacturing costs while achieving high shape accuracy.

5 Claims, 4 Drawing Sheets

CARVING BLANK AND MANDREL FOR MOUNTING SAME IN A CARVING MACHINE

BACKGROUND OF THE INVENTION

This invention relates to improvements in carving blanks and mandrels for mounting same in computer controlled carving machines particularly those used in prosthetic and orthotic applications.

Polyurethane foam blocks, otherwise referred to herein as carving blanks, of various shapes and sizes are typically used to produce three dimensional positive molds for use in the prosthetics and orthotics industry. To produce these molds, the foam blanks are typically mounted on a mandrel which is then fitted into a numerically (computer) controlled carving machine. The mandrel is rotated at a high speed while a drilling tool controlled by the machine's computer is moved in predetermined manner relative to the mandrel to carve out the predetermined shape.

Some of the problems associated with the prior art techniques were that the carving blanks were difficult to mount and dismount from the mandrel. It was also possible to mount the blank in more than one angular orientation relative to the mandrel, this being considered undesirable by those skilled in the art. The major reason for this is that unless the carving blanks were cylindrically symmetric it was difficult to ensure that free form shapes whose sizes were close to that of the block would actually fit inside the block and not have missed portions. At higher speeds the carving blanks tended to rotate or slide during the carving process. Two commonly used prior art blanks are known respectively as Regnier blanks and IPOS blanks. The first blank mentioned above required a large volume (footprint) of the blank to be used for the mounting hardware thus resulting in excessive wastage of material and there were two possible ways of mounting the blanks on the mandrel which, as noted above, is considered undesirable in this particular field of art. The second blank mentioned above tended to be somewhat difficult to manufacture in that the initial key used to mount the blank on the mandrel could not be easily freed from the mold after the molding process. A certain amount of manual manipulation was required to produce the final product. In use, the blank tended to be difficult to mount as a locking key and several screws had to be used to secure the blank to the mandrel. This design also tended to use a large volume of carving blank for the mounting hardware thus resulting in a wastage of time and materials.

SUMMARY OF THE INVENTION

The objectives of the present invention are: to provide carving blanks which are simple to mount and dismount from the mandrel; to provide carving blanks and mandrels which enable blanks to be repeatably mounted on the mandrel in one position and angular orientation only relative to the mandrel; to position and provide a means for keeping the carving blanks firmly fixed in place on the mandrel during the carving operation; to provide blanks which are simple and inexpensive to manufacture; to provide a means for minimizing the volume used of the blank during carving to reduce wastage of material while at the same time maximizing the stability of the blank relative to the mandrel such that the rotational and longitudinal forces exerted during carving can be withstood; and to provide a means for helping to ensure that carving blanks can be recarved multiple times while the carvings so produced are guaranteed to be completely contained within the volume of the carving blank that is used, regardless of whether this is a new or previously carved blank.

Accordingly, the invention in one aspect provides a carving blank adapted to be mounted on a mandrel for rotation about the mandrel axis while a carving tool is moved in predetermined fashion relative to the mandrel to effect carving of the blank to a preselected shape, said blank having a pair of opposing ends and a central hole extending lengthwise between said ends to receive the mandrel, one of said ends having a recess shaped to complement and receive a drive insert forming part of said mandrel such that said blank can have only a unique single position and angular orientation along and about the axis of the mandrel when fully mounted thereon.

In one form of the invention said recess has a first portion of a non-circular cross-section adapted to receive therein a drive insert mounting plate of the same outline shape.

In a preferred embodiment said first recess portion is of a generally D-shaped cross-section.

Typically said recess includes a further portion having at least one slot adapted to receive a drive insert fin to further stabilize said blank relative to said mandrel.

Preferably a pair of said slots are provided in diametric opposition to one another relative to said central hole.

In the preferred form of the invention said D-shaped first recess portion is located immediately adjacent said one end of the blank with said further portion having said diametrically opposed slots being disposed inwardly of the first recess portion in the lengthwise direction of said central hole.

The carving blank is typically made from a suitably shaped block of polyurethane foam.

In accordance with a further aspect of the invention there is provided a mandrel for use in a carving machine wherein during use, a carving blank is mounted on the mandrel for rotation therewith about the mandrel axis while a carving tool is moved in predetermined fashion relative to the mandrel to effect carving of the blank to a predetermined shape; said mandrel including a spindle defining said axis and adapted to extend lengthwise along a central hole in said blank which is disposed between opposed ends of the latter; said mandrel also including a drive insert disposed on said spindle and shaped to complement and to be received in a recess formed in one of said ends of the carving blank such that said blank can have only a unique single position and angular orientation along and about said mandrel axis when fully mounted on the mandrel.

In one form of the invention said mandrel drive insert includes a mounting plate of non-circular outline shape adapted to be received in a first portion of the carving blank recess which is shaped to complement the shape of the mounting plate.

In the preferred form of the invention said drive insert mounting plate is of a generally D-shaped outline.

Typically said drive insert further includes at least one fin adapted to be received in a slot in a further portion of said recess to further stabilize said blank relative to said mandrel.

In a further form of the invention a pair of said fins are provided in diametric opposition to one another relative to the spindle of the mandrel.

In a preferred embodiment of the invention said drive insert includes a sleeve portion extending away from said mounting plate and adapted to surround a portion of said spindle; said fins being mounted to said sleeve in diametrically opposed relation thereto. Preferably said drive insert is removably attached to the mandrel via a drive disc fixed to said spindle and removably engaged with the drive insert mounting plate.

Preferred embodiments of the invention will now be described by way of example with reference being had to the appended drawings.

BRIEF DESCRIPTION OF THE VIEWS OF DRAWINGS

DETAILED DESCRIPTION OF PREFERRED EMBODIMENT

Figure 1:
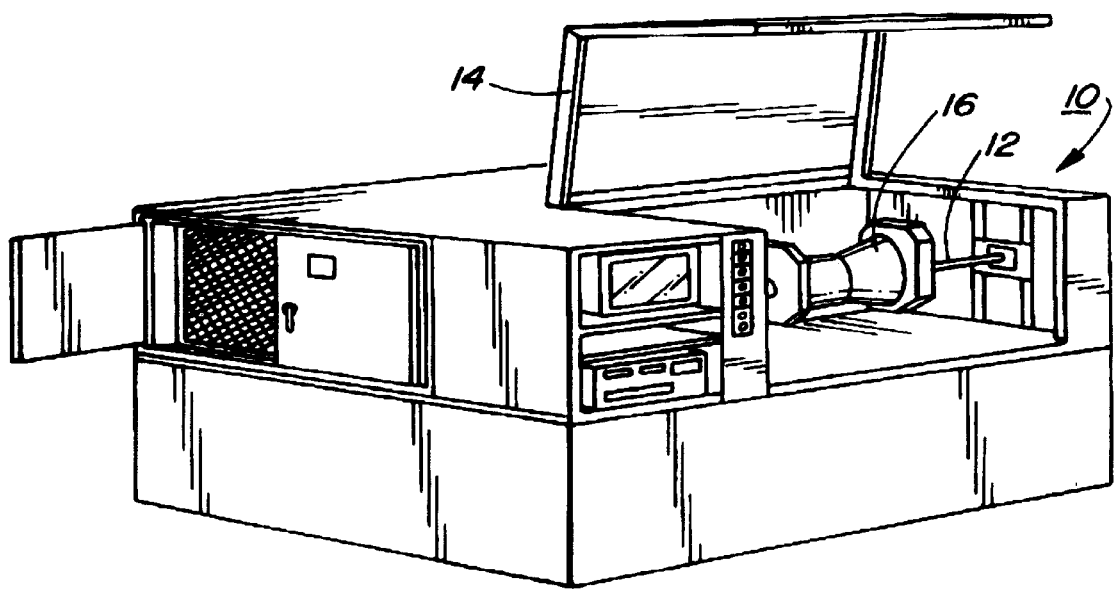
FIG. 1 is a perspective view of a suitable numerically controlled carving machine.

Referring firstly to FIG. 1, there is shown a numerically controlled carving machine 10 capable of carving prosthetic and orthotic positive shapes accurately and at relatively high speed. One particularly suitable form of carving machine is sold under the trade-mark "CANFIT-PLUS" and is available from the assignee of the present invention, Vorum Research Corporation, 8765 Ash Street, Suite 6, Vancouver, British Columbia, V6P 6T3, Canada. This carving machine has been tailored specifically for the prosthetics and orthotics industry and is designed to carve industry standard, environmentally safe polyurethane foam blanks. It can handle sizes ranging from small upper extremity shapes to very large spinal shapes. The carver incorporates a computer whose on board software provides interactive carver control, dynamic feed rate adjustments, software spindle on/off control, carver calibration, carve file queuing and selection. In operation, the carving blank is mounted on a mandrel 12 in the manner to be described more fully hereinafter. The patient file incorporating the several carving parameters is loaded into the computer, the access door 14 is closed, the vacuum dust eliminating system is turned on and the machine is started. The blank will be automatically positioned and carved in accordance with the predetermined specifications contained in the computer program. During carving the spindle is driven at a relatively high speed by a 1.5 HP, 3400 RPM spindle motor while at the same time control motors in the form of stepper and/or servo motors for high positioning accuracy and smooth movements provide simultaneous three axis control. All three axes have absolute reference control for accurate repositioning. (The three axes referred to are the rotation axis of the mandrel, an axis defined by the movement of the cutting tool (not shown) toward and away from the mandrel axis, and the axis of movement of the cutting tool in the lengthwise direction of the mandrel axis.)

Following completion of the carving operation, the carver 10 shuts off, and the access door 14 may be swung to the open position thereby allowing the mandrel 12 and the carved shape 16 (as illustrated in FIG. 1) to be removed.

Figure 3:
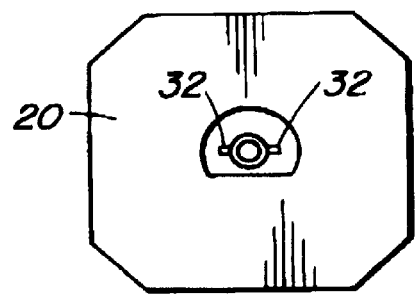
FIGS. 3 and 4 are top and bottom end views of the carving blank of FIG. 2, respectively.
Figure 2:
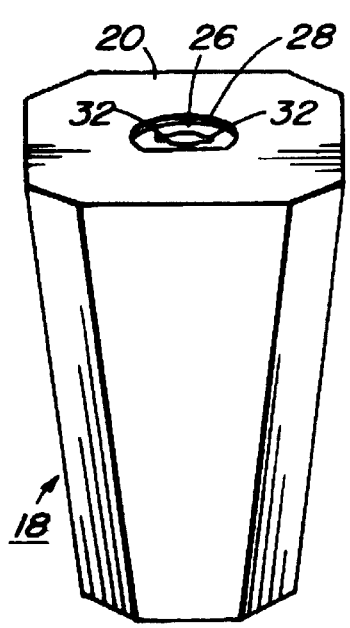
FIG. 2 is a perspective view of a carving blank in accordance with one embodiment of the present invention.
Figure 2A:
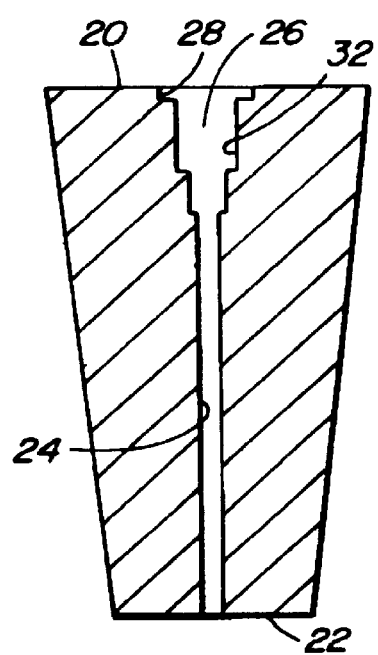
FIG. 2A is a section view taken along the longitudinal axis of the carving blank of FIG. 2.
Figure 2B:
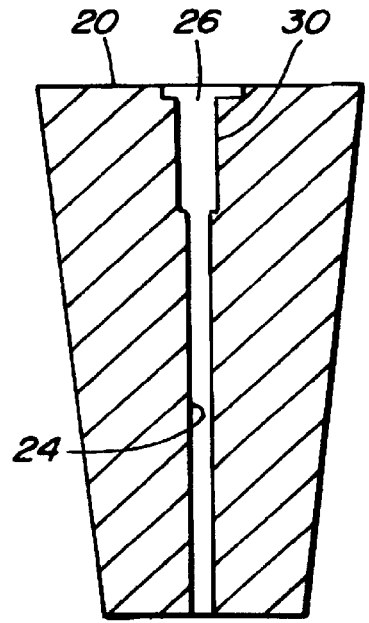
FIG. 2B is a section view similar to that of FIG. 2A but wherein the carving blank has been rotated 90° from the position shown in FIG. 2A.
Figure 4:
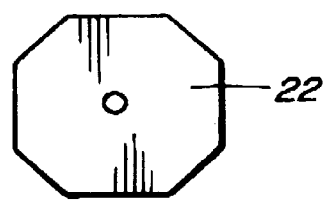

Referring now to FIGS. 2–4, there is shown a polyurethane foam carving blank 18 in accordance with the invention which is adapted to be mounted on the mandrel 12 for rotation about the mandrel axis while a carving tool (not shown) is moved in predetermined fashion relative to the mandrel to effect carving of the blank to a predetermined shape. The blank may have any desired density, usually in the range of 2–10 lbs./cubic foot.

The overall shape of the foam blank may be varied to suit individual requirements. A stock blank as described below may be used or in other cases, a previously carved blank can be used provided that the new shape will "fit" completely inside it. Proper orientation and positioning of the blank is important and especially so in the latter case. In the embodiment illustrated here, the blank 18 is in the form of an eight-sided figure which tapers downwardly somewhat in size from the top end 20 shown in FIG. 3 to the bottom end 22 shown in FIG. 4. The opposing ends 20, 22 of the blank are parallel to one another and a central hole extends lengthwise between these opposing ends to receive the mandrel. As illustrated, end 20 of the blank is provided with a recess 26 shaped to complement and receive a drive insert forming part of the mandrel, such that the blank can have only a unique single position and angular orientation along and about the axis of the mandrel when fully mounted on the mandrel.

With further reference to the drawings it will be seen that the recess 26 includes a generally D-shaped first recess portion 28 located immediately adjacent said one end 20 of the blank. This D-shaped first recess portion 28 is adapted to receive therein a drive insert mounting plate of the same outline shape as will be described hereinafter. The recess 26 includes a further portion 30 of somewhat greater diameter than the lengthwise extending hole 24 referred to previously with this further portion 30 having a pair of diametrically opposed slots 32 disposed inwardly of the first recess portion 28 in the lengthwise direction of the central hole 24. These diametrically opposed slots 32 are adapted to snugly receive drive insert fins associated with the mandrel 12 to further stabilize the blank 18 relative to the mandrel during the carving operation as will be described in further detail hereinafter.

Referring now to FIGS. 5–9 there is shown a mandrel 12 for use in a carving machine such as been described above wherein, during use, the carving blank described above is mounted on the mandrel 12 for rotation about the mandrel axis while the computer controlled carving tool is moved in predetermined fashion relative to the mandrel to effect the carving of the blank to the desired predetermined shape.

The mandrel 12 includes an elongated spindle 34 adapted to extend lengthwise through the central hole 24 in the blank between the opposed ends of the latter. The mandrel also includes a drive insert 36 (shown in more detail in FIGS. 5 and 6) which is shaped to complement and to be received in the above-described recess 26 formed in the end of the carving blank such that, as described previously, the blank 18 can have only a unique single position and angular orientation along and about the mandrel axis when the blank is fully mounted on the mandrel.

The mandrel drive insert 36 includes a mounting plate 38 of a generally D-shaped outline configuration. As noted previously, this is adapted to be received in the first portion 28 of the carving blank recess which, as noted above, is shaped to complement exactly the shape of the mounting plate 38 whereby relative rotation therebetween is rendered impossible.

Figure 5:
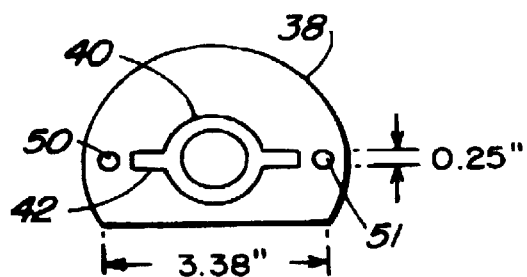
FIG. 5 is an end elevation view of a drive insert forming part of a mandrel for use in a carving machine.
Figure 6:
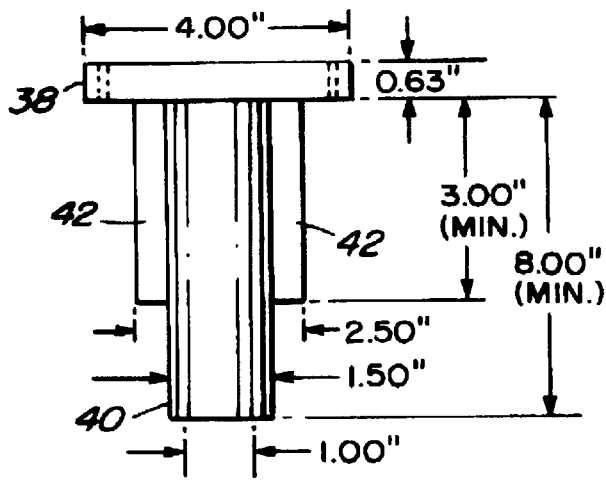
FIG. 6 is a side elevation view of the drive insert of FIG. 5.

The drive insert 36 further includes a cylindrical sleeve portion 40 which extends away from the mounting plate 38 and which is adapted to surround a portion of the mandrel spindle 34. A pair of fins 42 are mounted to said sleeve in diametrically opposed relation thereto. During use, these fins 42 are snugly received in the diametrically opposed slots 32 provided in the carving blank as described above, while at the same time, the sleeve 40 is received in the larger diameter further portion 30 of the recess noted previously. These fins 42 further stabilize the blank relative to the mandrel during the carving operation thus enabling high accuracy carving to be achieved. (The dimensions shown in FIGS. 5 and 6 are illustrative only and not limiting.)

Figure 7:
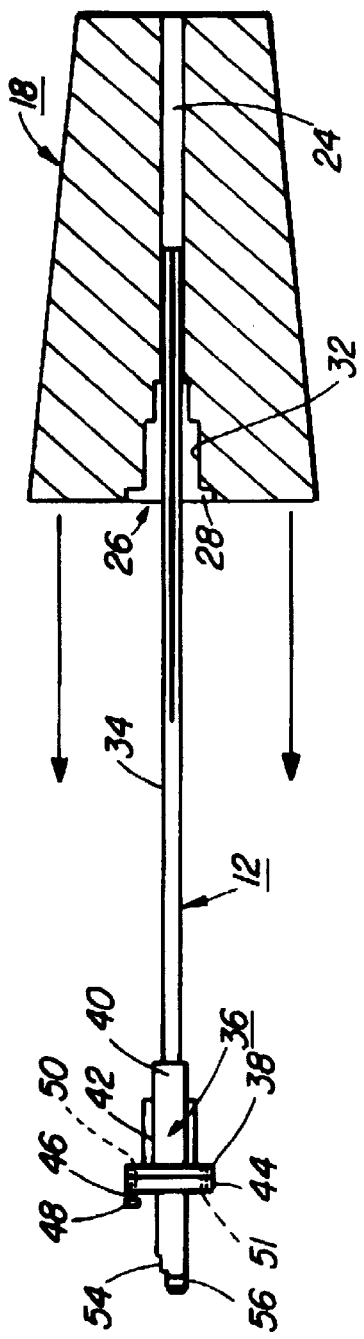
FIG. 7 is a elevation view showing a mandrel in accordance of one aspect of the invention together with a carving blank also in accordance with the present invention (and shown in longitudinal section) and illustrating the manner in which the carving blank is slid onto the mandrel during the mounting procedure.

As best seen in FIG. 7, the drive insert 36 is removably attached to the spindle 34 by way of a drive disc 44 which is fixed to the spindle 34 and removably engaged with the drive insert mounting plate 38. The drive disc 44 is provided with a threaded stud 46 and a knob 48 and the drive insert mounting plate is correspondingly threaded at 50 to receive the end of the stud 46 so that once the drive insert 36 has been slid along the spindle 34 thereby to bring the mounting plate 38 into suitably angularly aligned contact with the drive disc 44, the knob and threaded stud 46, 48 may be rotated manually thereby to secure the drive insert 36 firmly to the drive disc 44. To provide for further certainty, the drive disc 44 is provided with a drive pin 51 which is diametrically opposed to the aforementioned knob and stud, which pin 51 enters into a correspondingly sized aperture 52 provided in the mounting plate of the drive insert. This arrangement not only firmly secures the drive insert 36 to the drive disc 44, but also ensures that the drive insert 36 occupies a predetermined angular position about the mandrel axis at all times.

It will be noted here that the proximal end of the mandrel is provided with a downwardly stepped end portion having a flat section 54 thereon as well as a transversely extending aperture 56 through which a set screw (not shown) can be inserted. This flat portion 54 cooperates with a corresponding flat on the rotary drive of the carver thereby ensuring that all components of the mandrel together with the blank mounted thereon are in a predetermined angular relationship at all times thereby ensuring that the ultimate carved shape conforms as closely to the specifications as is reasonably possible.

Figure 8:
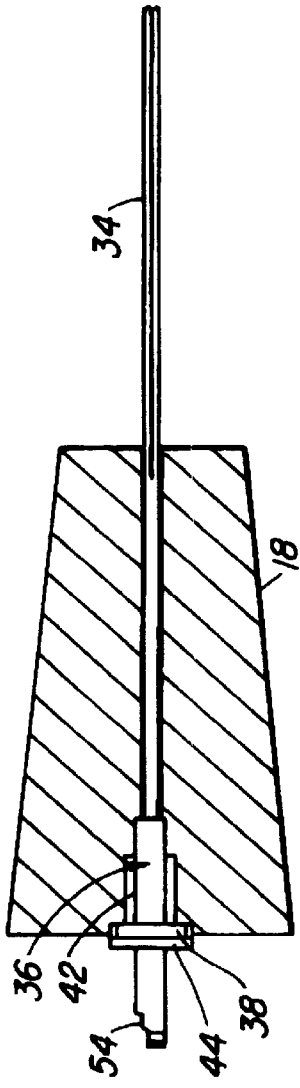
FIG. 8 is a view similar to that of FIG. 7 but showing the carving blank fully mounted on the mandrel.
Figure 9:
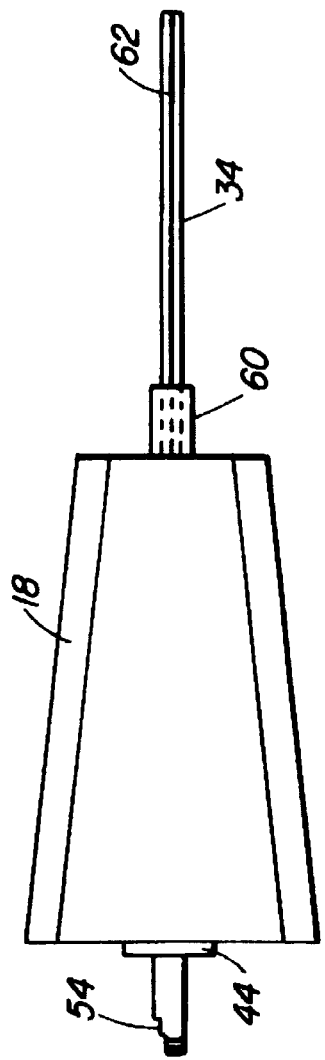
FIG. 9 is a view similar to FIG. 8 but with the blank shown in full and with an optional locking collar positioned on the mandrel spindle to further stabilize the blank in the axial direction during carving.

The procedure for mounting the carving blank 18 on the mandrel is illustrated in FIGS. 7–9. The mandrel 12, having been previously removed from the carving machine, is inserted, distal end first, into the lengthwise extending central hole of the blank and the blank 18 is then slid along spindle 34 in the direction of the arrows toward the drive insert 36 which is located adjacent the proximal end of the mandrel. The blank is of course rotated relative to the spindle axis thereby to bring the slots 32 in the blank recess into alignment with the diametrically opposed fins 42 on the drive insert. The blank 18 is then moved further toward the proximal end of the mandrel thereby to bring the mounting plate 38 of the drive insert fully into the D-shaped first portion 28 of the recess. At this point, the relative positions of the mandrel 12 and blank 18 are as illustrated in FIG. 8. To further secure the blank on the mandrel and to further prevent relative axial movement between them, a collar 60 may be positioned on the spindle and brought into abutting relationship with the opposing end of the blank and a suitable set screw (not shown) tightened thereby to secure the axial position of the collar. It might also be noted here that the distal end portion of the spindle is provided with a ¼ inch wide elongated groove 62 which is positioned at 90° from the previously described flat portion provided at the proximal end of the mandrel. The groove provides a means for securing differently shaped collars in a specific orientation and with significant holding force, if necessary. It is especially useful for the large foam blocks typically used in the production of torso shapes.

Before the start of any carving, the carving machine is indexed about the rotation axis of the spindle to a known fixed position. This has the effect of placing the mandrel, and therefore the blank in a known position and orientation in space every time. Proprietary software is used to analyse the shape to be carved and determine the most cost efficient carving blank to use. In the latter case, the carving blank could be a stock blank or in fact a blank that had been previously carved and the new shape will fit completely inside it.

Figures 10, 11:
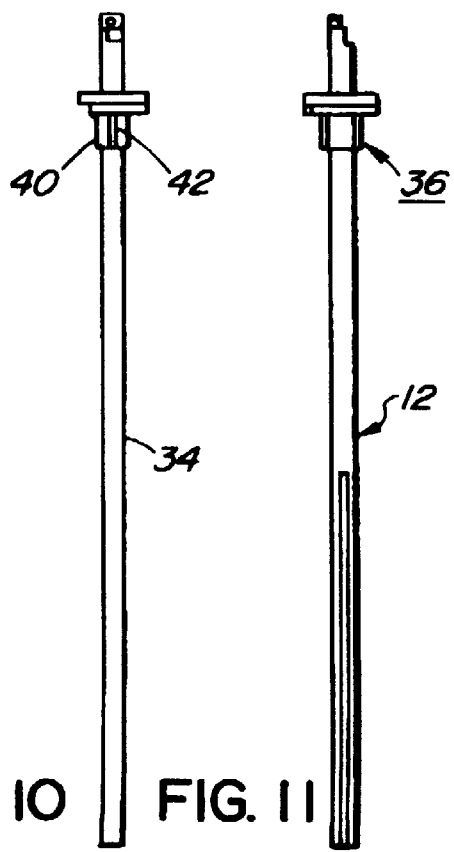
FIGS. 10 and 11 are side elevation views of a slightly modified form of mandrel in accordance with the invention with FIG. 11 showing the mandrel rotated 90° about its axis from the position shown in FIG. 10.

FIGS. 10 and 11 show a slightly modified form of mandrel. Essentially, the mandrel of FIGS. 10 and 11 is as described previously except that the drive insert 36 has been slightly modified such that the diametrically opposed fins 42 are co-extensive with the sleeve 40 whereas in the previous embodiment as best illustrated in FIG. 6, the sleeve 40 extends a distance beyond the fins 42. It should be appreciated however that the sleeve and the fins may have any desired length and in cases where additional stability is desired, the fins and the sleeve may be made much longer in the axial direction than is illustrated in the drawings.

It should also be mentioned here that although all of the drawings show the mandrel drive disc 44 to be of a circular configuration, it is also possible for the drive disc 44 to have exactly the same outline configuration as does the mounting plate 38 of the drive insert 36. In this case, the correspondingly D-shaped first recess portion 28 in the carving blank 18 is made sufficiently deep as to receive therein both the drive insert mounting plate 38 and the correspondingly shaped drive disc 44 which is fixed to the spindle 34. This arrangement provides still further stability and assists in ensuring still further that the carving blank can have only unique single angular orientation about the mandrel axis during operation.

A key benefit of the complete mounting system (blank, mandrel, machine referencing system, and analysis software) is that it allows systematic and efficient use of stock blanks and efficient reuse of previously carved blanks; this generates significant cost savings for customers using these machines.

Preferred embodiments of the invention have been described for purposes of illustration. Numerous modifications in the detail of construction, arrangement of parts presented may be made while still remaining within the spirit and scope of the invention. For definitions of the invention reference is to be had to the appended claims.

We claim:

1. A carving blank adapted to be mounted on a mandrel having a drive insert for rotation about the mandrel axis while a carving tool is moved in a predetermined fashion relative to the mandrel to effect carving of the blank to a preselected shape, said blank having a pair of opposing ends and a central hole extending lengthwise between said ends to receive the mandrel, one of said ends having a recess shaped to complement and receive the mandrel drive insert, said recess having a first portion of a substantially D-shaped cross-section adapted to receive therein a drive insert mounting plate of the same outline shape, and wherein said recess includes a further portion having a pair of slots in diametric opposition to one another relative to said central hole and adapted to receive drive insert fins to further stabilize said blank relative to said mandrel, and wherein said D-shaped first recess portion is located immediately adjacent said one end of the blank with said further portion having said diametrically opposed slots disposed inwardly of the first recess portion in the lengthwise direction of said central hole such that said blank can have only a unique single position and angular orientation along and about the axis of the mandrel when fully mounted on the mandrel.

2. The carving blank of claim 1, when made from polyurethane foam.

3. A mandrel for use in a carving machine wherein during use, a carving blank is mounted on the mandrel for rotation therewith about the mandrel axis while a carving tool is moved in a predetermined fashion relative to the mandrel to effect carving of the blank to a predetermined shape; said mandrel including a spindle defining the mandrel axis and adapted to extend lengthwise along a central hole in said blank which is disposed between opposed ends of the latter; said mandrel also including a drive insert disposed on said spindle and shaped to complement and to be received in a recess formed in one of said ends of the carving blank, said mandrel drive insert including a mounting plate of substantially D-shaped outline adapted to be received in a first portion of the carving blank recess shaped to complement the shape of the mounting plate, said drive insert further including a pair of fins in diametric opposition to one another relative to the spindle of the mandrel adapted to be received in slots in a further portion of said recess to further stabilize said blank relative to said mandrel, said drive insert also including a sleeve portion extending away from said mounting plate and adapted to surround a portion of said spindle; said fins being mounted to said sleeve in diametrically opposed relation thereto, such that said blank can have only a unique single position and angular orientation along and about said mandrel axis when fully mounted on the mandrel.

4. The mandrel assembly of claim 3, wherein said drive insert is removably attached to the mandrel via a drive disc fixed to said spindle and removably engaged with the drive insert mounting plate.

5. The mandrel assembly of claim 4 including a collar on said mandrel which can be brought into abutting relation to an opposing end of the blank to assist in securing the blank against movement along the mandrel axis away from said drive insert.

\* \* \* \* \*